(12) United States Patent
Ba et al.

(10) Patent No.: US 10,214,136 B2
(45) Date of Patent: Feb. 26, 2019

(54) ADAPTIVE VEHICLE ILLUMINATION UTILIZING VISUAL PATTERN LEARNING AND COGNITIVE ENHANCING

(71) Applicant: International Business Machines Corporation, Armonk, NY (US)

(72) Inventors: Yu Tao Ba, Beijing (CN); Bo Zhang, Beijing (CN); Lin Tang, Beijing (CN); Changrui Ren, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/706,857

(22) Filed: Sep. 18, 2017

(65) Prior Publication Data

US 2019/0031085 A1    Jan. 31, 2019

Related U.S. Application Data

(63) Continuation of application No. 15/661,008, filed on Jul. 27, 2017.

(51) Int. Cl.
*B60Q 1/08* (2006.01)
*G06K 9/00* (2006.01)
(Continued)

(52) U.S. Cl.
CPC ......... *B60Q 1/085* (2013.01); *G06K 9/00604* (2013.01); *G06K 9/00845* (2013.01);
(Continued)

(58) Field of Classification Search
None
See application file for complete search history.

(56) References Cited

U.S. PATENT DOCUMENTS

| 5,931,572 A * | 8/1999 | Gotoh | A61B 5/18 |
| | | | 362/272 |
| 6,778,892 B2 * | 8/2004 | Horii | B60Q 1/12 |
| | | | 307/10.8 |

(Continued)

FOREIGN PATENT DOCUMENTS

CN    103813941 B    2/2016

OTHER PUBLICATIONS

Oh et al., "Recognition of a driver's gaze for vehicle headlamp control", IEEE Transactions on Vehicular Technology, vol. 61, No. 5, Jun. 2012, pp. 2008-2017.

(Continued)

*Primary Examiner* — Redhwan K Mawari
*Assistant Examiner* — Edward Torchinsky
(74) *Attorney, Agent, or Firm* — Gilbert Harmon, Jr.

(57) ABSTRACT

Embodiments describing an approach to receiving visual feedback. Generating a recommended visual pattern based on the visual feedback. Tracking a driver's real-time visual pattern. Extracting the driver's real-time visual patterns from the eye-tracking data. Determining the differences between the recommended visual pattern and the driver's real-time visual pattern. Generating enhanced headlamp control configurations based on the determined differences between the recommended visual pattern and the driver's real-time visual pattern; and adjusting the headlamp calibration controls based on the enhanced headlamp control configuration.

1 Claim, 6 Drawing Sheets

(51) Int. Cl.
*G06N 5/04* (2006.01)
*B60Q 1/12* (2006.01)

(52) U.S. Cl.
CPC ............... *G06N 5/047* (2013.01); *B60Q 1/12* (2013.01); *B60Q 2300/112* (2013.01); *B60Q 2300/114* (2013.01); *B60Q 2300/23* (2013.01)

(56) References Cited

U.S. PATENT DOCUMENTS

| | | |
|---|---|---|
| 7,150,549 B2 | 12/2006 | Olds et al. |
| 8,433,479 B2 | 4/2013 | Lukacs et al. |
| 9,227,553 B2 | 1/2016 | Nordbruch |
| 9,227,555 B2 | 1/2016 | Kalapodas |
| 9,381,851 B2 | 7/2016 | Niemz |
| 9,707,885 B2 | 7/2017 | Langkabel et al. |
| 2005/0195613 A1* | 9/2005 | Morishita ............... B60Q 1/12 362/507 |
| 2016/0152173 A1* | 6/2016 | Mayer .................... B60Q 1/085 362/466 |
| 2017/0072880 A1 | 3/2017 | Higgins-Luthman et al. |

OTHER PUBLICATIONS

"Guiding Light: Eye-tracking Technology from Opel", Opel, <http://www.opel.com.sg/experience/about-opel/opel-news/2015/03/eye-tracking-technology-from-opel.html>, Mar 12, 2015, 4 pages.

Ba et al., "Adaptive Vehicle Illumination Utilizing Visual Pattern Learning and Cognitive", U.S. Appl. No. 15/661,008, filed Jul. 27, 2017, 35 pages.

IBM Appendix P, list of patents or patent applications treated as related, Sep. 2017, 2 pages.

* cited by examiner

ADAPTIVE VEHICLE ILLUMINATION UTILIZING VISUAL PATTERN LEARNING AND COGNITIVE ENHANCING

BACKGROUND OF THE INVENTION

The present invention relates generally to the field of vehicle illumination, and more particularly to adjusting vehicle headlights based on a driver's visual pattern.

Many drivers have experienced the danger of dark curvy roads while driving through the countryside. For the most part drivers don't know what lies around the curve until the vehicle headlights on the nose of the vehicle shine their light on the road. Most vehicles today have fixed vehicle headlights that only shine in the direction the nose of the vehicle is facing; however, there are some vehicles that possess the ability to tilt in the direction the steering wheel is turned. For example, the driver is driving along a curvy road and the road has a curve angling right so the drive naturally turns the steering wheel slightly right to follow the road, and in turn the headlights tilt to follow the headlight and shine light on some of the curve. However, only partly solves the issue of illuminating roads to provide a safer driving condition. Embodiments of the present invention, learn from the driver's visual patterns to identify potential hazardous areas on the road and illuminate them in order to alert the driver and/or make the driver more aware of his or her surroundings.

SUMMARY

Embodiments of the present invention disclose a method, a computer program product, and a system for adjusting headlight calibration controls based on eye-tracking data for improving driver safety, the method can include, receiving, by one or more processors, visual feedback. Generating, by the one or more processors, a recommended visual pattern based on the visual feedback. Tracking, by the one or more processors, a driver's real-time visual pattern, wherein tracking a driver's real-time visual pattern further comprises driving characteristics, wherein driving characteristics comprise the vehicles speed, velocity, how fast the driver accelerates, the amount of pressure the driver applies to the breaks, how often the breaks are being applied, the speed at which the gears are shifted, and average revolutions per minute (RPM). Extracting, by the one or more processors, the driver's real-time visual patterns from eye-tracking data, wherein extracting the driver's real-time visual patterns from the eye-tracking data further comprises extracting fixation indexes from the eye-tracking data, wherein eye-tracking data comprises: where the driver is looking, where the driver is focusing, the area of the road the driver is not focusing on, the driver's peripheral vision, visual blind spots, when the driver blinks, the rate at which the driver blinks, how strained the drivers eyes become while trying to focus on the road, road visibility, level of visual stimuli on the road, or how the drivers pupil react to different stimuli. Determining, by the one or more processors, differences between the recommended visual pattern and the driver's real-time visual pattern. Generating, by the one or more processors, enhanced headlamp control configurations based on the determined differences between the recommended visual pattern and the driver's real-time visual pattern. Adjusting, by the one or more processors, headlamp calibration controls based on the enhanced headlamp control configuration. Creating, by the one or more processors, a driver profile. Storing, by the one or more processors, driver data to a database, and updating, by the one or more processors, driver profile data.

DETAILED DESCRIPTION

Figure 1:
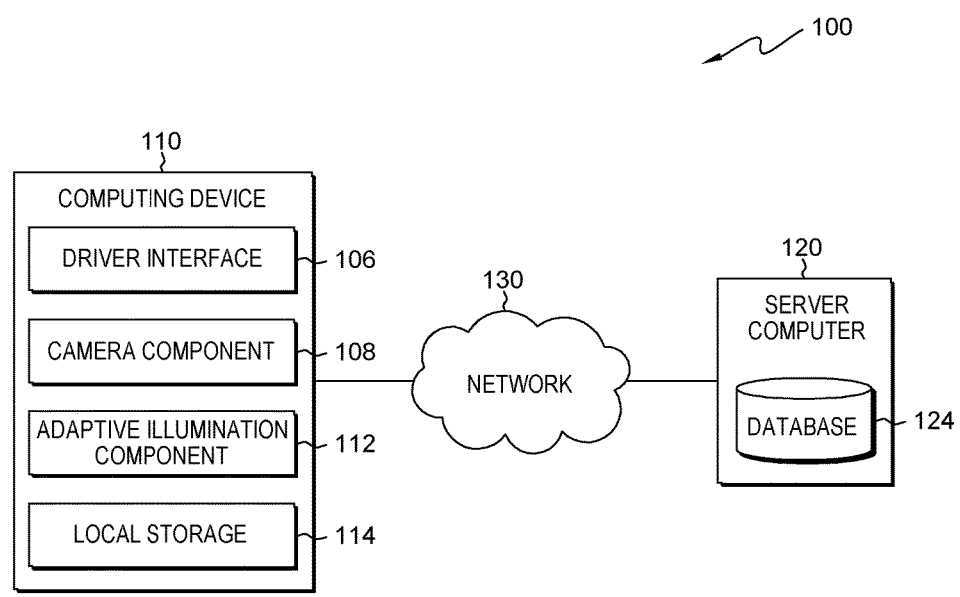
FIG. 1 is a functional block diagram illustrating a distributed data processing environment, in accordance with an embodiment of the present invention.

Currently, essentially all motorized vehicles comprise headlights in order to provide a safer driving condition for the driver, other drivers on the road, and pedestrians. There are several systems that have attempted to improve vehicle headlights to increase drivers risk perception in dark environments but few have made very little headway. Most advances in the field of headlights simply increase the luminosity and lighting of the lamps. For example, the evolution of headlights includes halogen headlights, high intensity discharge (HID) headlights, light emitting diode (LED) headlights, and laser light headlights. Aside from the increase in headlight luminosity, adaptive front lighting (AFL) has been introduced to change the dynamics of headlight lighting by semi-adapting to a curve in the road. For example, adaptive characteristics include the spot beam, which is a long range light for marking rows, fences lines, etc., the flood beam, which is an excellent work light which illuminates wide and short areas, and the combo beam, which is the combination of a spot beam and a flood beam which is suitable for a city road. However, theses advancements are limited.

The luminosity and light of areas on the road are limited to the headlights lighting power and requirements of energy efficiency. Additionally, the increase in complexity of headlights and the corresponding control algorithms make headlight luminosity very complex. For example, there are too many independent elements that need to be controlled, the headlight control algorithm calibrated in the factory cannot consider all the road effects and/or conditions, and the fixed configurations on the headlight control algorithm cannot optimally adapt to all driving situations. Embodiments of the present invention improve the art of vehicle headlights by combining the human visual patterns and learning algorithm to control the complex illumination system both dynamically and adaptively, which enhances driver safety by improving the driver's capacity of hazard detection and urgency response.

Eye-tracking technology and vehicle headlights have co-existed for years and despite their co-existence there have been many failed attempts and years of experimentation to develop embodiments of the present invention. Additionally, embodiments of the present invention use in-vehicle eye-tracking sensors to construct an optimized control strategy for the vehicle headlights in order to provide a higher capacity of visual perception for the driver. Embodiments of the present invention comprise three parts 1) a visual priority calculator, to calculate the priority levels of drivers' visible space considering situational effects and generate the recommended visual pattern, 2) visual pattern learning, to extract driver's real-time visual pattern from eye-tracking data, and calculate the gap between real pattern and recommended pattern, and 3) cognitive enhancing controller, to cognitively enhance headlight control configurations through training one or more learning models for higher performance based on a driver's visual pattern, driving patterns/record, and/or driving preferences.

Implementation of embodiments of the invention may take a variety of forms, and exemplary implementation details are discussed subsequently with reference to the Figures.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the driver's computer, partly on the driver's computer, as a stand-alone software package, partly on the driver's computer and partly on a remote computer or entirely on the remote computer or server. In the latter scenario, the remote computer may be connected to the driver's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It can be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It can also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations can be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

FIG. 1 is a functional block diagram illustrating a distributed data processing environment, generally designated 100, in accordance with one embodiment of the present invention. The term "distributed" as used in this specification describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes computing device 110, server computer 120, and network 130. Network 130 can be, for example, a telecommunications network, a local area network (LAN), a wide area network (WAN), such as the Internet, or a combination of the three, and can include wired, wireless, or fiber optic connections. Network 130 can include one or more wired and/or wireless networks that are capable of receiving and transmitting data, voice, and/or video signals, including multimedia signals that include voice, data, and video information. In general, network 130 can be any combination of connections and protocols that will support communications between computing device 110 and server computer 120, and other computing devices (not shown in FIG. 1) within distributed data processing environment 100.

In various embodiments, computing device 110 can be, but is not limited to, a standalone device, a server, a laptop computer, a tablet computer, a netbook computer, a personal computer (PC), a smart phone, a desktop computer, a smart television, a smart watch, any programmable electronic computing device capable of communicating with various components and devices within distributed data processing environment 100, via network 130 or any combination therein. In general, computing device 110 is representative of any programmable mobile device or a combination of programmable mobile devices capable of executing machine-readable program instructions and communicating with drivers of other mobile devices via network 130 and/or capable of executing machine-readable program instructions and communicating with server computer 120. In other embodiments, computing device 110 can represent any programmable electronic computing device or combination of programmable electronic computing devices capable of executing machine readable program instructions, manipulating executable machine readable instructions, and communicating with server computer 120 and other computing devices (not shown) within distributed data processing environment 100 via a network, such as network 130. Computing device 110 includes an instance of driver interface 106. Computing device 110 and driver interface 106 allow a driver to interact with adaptive illumination component 112 in various ways, such as sending program instructions, receiving messages, sending data, inputting data, editing data, correcting data, displaying, communicating and/or receiving data. Computing device 110 can include driver interface 106, camera component 108, adaptive illumination component 112, and local storage 114. Computing device 110 can include internal and external hardware components, as depicted and described in further detail with respect to FIG. 4.

Driver interface 106 (UI) provides an interface to adaptive illumination component 112 on computing device 110 for a driver of server computer 120 and/or computing device 110. In one embodiment, UI 106 can be a graphical driver interface (GUI) or a web driver interface (WUI) and can display text, documents, web browser windows, driver options, application interfaces, and instructions for operation, and include the information (such as graphic, text, and sound) that a program presents to a driver and the control sequences the driver employs to control the program. In another embodiment, UI 106 can also be mobile application software that provides an interface between a driver of computing device 110 and server computer 120. Mobile application software, or an "app," is a computer program designed to run on smart phones, tablet computers and other mobile devices. In an embodiment, UI 106 enables the driver of computing device 110 to send data, input data, edit data, correct data and/or receive data. In various embodiments, UI 106 can enable a driver to manually adjust adaptive illumination component 112 settings, which in turn can enable a driver to manually adjust the vehicle headlights. It should be noted that headlights can mean headlamps and/or any other form of lights used for transportation, communication, and/or electronics known in the art.

Adaptive illumination component 112 can adjust a vehicles headlights based on a driver's visual pattern. In various embodiments, adaptive illumination component 112 utilizes in-vehicle eye-tracking sensors to construct an optimized control strategy for vehicle headlights in order to increase a driver's visual perception of the road. In various embodiments, adaptive illumination component 112 constructs an optimized vehicle headlight strategy by (1) calculating the priority levels of a driver's visible space and generating a visual pattern, (2) visual pattern learning, via eye-tracking data, and (3) cognitive enhancing headlight controlling. For example, when a driver is driving down a dark curvy road out on the countryside, which has low visibility, adaptive illumination component 112 tracks the drivers eye pattern through a camera built into the dash. In this particular example, adaptive illumination component 112 calculates priority levels of the driver's visible space and notices the driver is straining their eyes to focus down the road. In this particular example, adaptive illumination component 112 adjusts the vehicle headlights to shine further down the road by increasing brightness, beam focus, and angle of the light in order to increase the driver's visibility. A method for adapting vehicle illumination utilizing visual pattern learning and cognitive enhancing is depicted and described in further detail with respect to FIG. 2.

Camera component 108 on computing device 110 can record images and/or videos. In various embodiments, camera component 108 can identify, record, and/or analyze a driver's facial expression and/or visual patterns. In other embodiments, camera component 108 track a driver's visual pattern through eye-tracking. Camera component 108 can identify and/or measure where a driver is looking (i.e., the drivers visual focus), what a driver's blind spot, the area of the road the driver is not focusing on, when a user blinks, how often and/or the rate driver blinks, how strained and/or focused a driver's eyes become while trying to focus on the road, the amount of strain on the drivers eye's while driving and/or how a driver's pupil react to different stimuli. Camera component 108 can output and/or store the identified driver information as eye-tracking data on local storage 102 and/or database 124. In other embodiments, adaptive illumination component 112 can request and/or receive eye-tracking data from camera component 108, local storage 102, and/or database 102.

Server computer 120 can be a standalone computing device, a management server, a web server, a mobile computing device, or any other electronic device or computing system capable of receiving, sending, and processing data. In other embodiments, server computer 120 can represent a server computing system utilizing multiple computers as a server system, such as in a cloud computing environment. In another embodiment, server computer 120 can be a laptop computer, a tablet computer, a netbook computer, a personal computer (PC), a desktop computer, a personal digital assistant (PDA), a smart phone, or any other programmable electronic device capable of communicating with computing device 110 and other computing devices (not shown) within distributed data processing environment 100 via network 130. In another embodiment, server computer 120 represents a computing system utilizing clustered computers and components (e.g., database server computers, application server computers, etc.) that act as a single pool of seamless resources when accessed within distributed data processing environment 100. Server computer 120 can include database 124 and adaptive illumination component 112. Server computer 120 can include internal and external hardware components, as depicted and described in further detail with respect to FIG. 4.

Database 124 and/or local storage 114 can be a data repository and/or a database that can be written to and read by one or a combination of adaptive illumination component 112, server computer 120 and/or computing device 110. In the exemplary embodiment, database 124 resides on server computer 120 and local storage 114 resides on computing device 110. In another embodiment, database 124 and/or local storage 114 can reside elsewhere within distributed data processing environment 100 provided adaptive illumination component 112 has access to database 124. In various embodiments, local storage 114 can be a database. A database is an organized collection of data. Database 124 and/or local storage 114 can be implemented with any type of storage device capable of storing data and configuration files that can be accessed and utilized by server computer 120, such as a database server, a hard disk drive, or a flash memory. In other embodiments, database 124 and/or local storage 114 can be hard drive(s), memory card(s), computer output to laser disc (cold storage), and/or any form of data storage known in the art. In various embodiments, database 124 and/or local storage 114 can be a data repository for storing and accessing driver information, such as driving habits, driving style, average speed and/or velocity, eye-tracking data, and/or any other driving information known in the art. Eye-tracking data can be, but is not limited to, where the driver is looking, where the driver is focusing, the area of the road the driver is not focusing on, the driver's peripheral vision, visual blind spots (e.g. vehicle design flaws that blind a drivers vision to a certain on the road or around the vehicle), when the driver blinks, the rate at which the driver blinks, how strained the drivers eyes become while trying to focus on the road, road visibility, level of visual stimuli on the road, and/or how the drivers pupil react to different stimuli. In various embodiments, database 124 can be a shared storage system and/or device.

Figure 2:
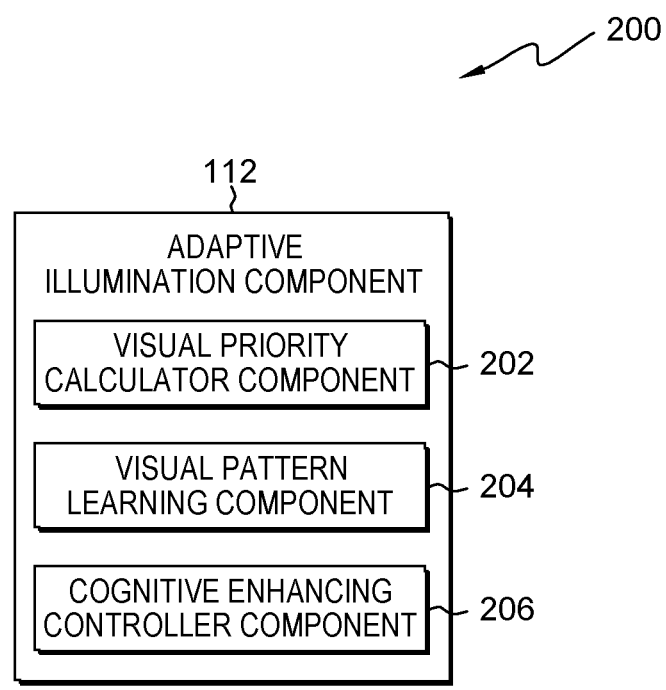
FIG. 2 is a functional block diagram illustrating a distributed data processing environment, in accordance with an embodiment of the present invention.

FIG. 2 is a functional block diagram illustrating adaptive illumination component 112, generally designated 200, in accordance with an embodiment of the present invention. FIG. 2 provides only an illustration of one implementation and does not imply any limitations with regard to the environments in which different embodiments may be implemented. Many modifications to the depicted environment may be made by those skilled in the art without departing from the scope of the invention as recited by the claims. Computing environment 200 includes adaptive illumination component 112. Adaptive illumination component 112 comprises visual priority calculator component 202, visual pattern learning component 204, and cognitive enhancing controller component 206.

In the exemplary embodiment, visual priority calculator component 202 is a subcomponent of adaptive illumination component 112 housed on computing device 110; however, visual priority calculator component 202 can be housed on server computer 120, a separate computing device not depicted in FIG. 1 and/or visual priority calculator component 202 can be a stand-alone device. Generally, visual priority calculator component 202 may be housed anywhere in environment 100, as long as it remains a subcomponent of adaptive illumination component 112.

$$TTC_{x,y}=D/V_{relatively}=D/(V_{vehicle}-V_{x,y})$$

$$P_{x,y}=1/TTC_{x,y}$$

Equation 1: Illustrates the equation used by adaptive illumination component 112 (i.e., visual priority calculator component 202) to calculate the risk priority. "TTC" represents "time to collision" and "P" represents "priority risk." The equation utilizes vertical and horizontal predictive eye patterns. based on the radar data.

$$P_{visual}=\text{PROJECT}_{3D \text{ to } 2D}\{P_{x,y}\}$$

Equation 2: Illustrates the equation used by used by adaptive illumination component 112 (i.e., visual priority calculator component 202) to create the recommended visual pattern. The equation is used to transform the calculated risk priority into a recommended visual pattern.

In various embodiments, visual priority calculator component 202 can calculate the priority levels of a driver's visible space while considering situational effects and generate a recommended visual pattern. In various embodiments, visual priority calculator component 202 generates a recommended visual pattern by 1) calculating the risk priority in driving situations using Equation 1, and 2) projecting risk priority into a visual map as a recommended visual pattern, using Equation 2. In various embodiments, visual priority calculator component 202 can utilize a radar component to detect the distances between the vehicle and the surrounding environment, and present the detected information as visual feedback. Additionally, visual priority calculator component 202 can calculate objective risk levels and generate a high visual priority map and recommend a visual pattern. For example, a car driving in bumper to bumper traffic, visual priority calculator component 202 would acknowledge the dense traffic and close proximity of the surrounding cars and suggest a wider and brighter headlight beam, which in turn would target a vehicles bumper and/or license plate.

In the exemplary embodiment, visual pattern learning component 204 is a subcomponent of adaptive illumination component 112 housed on computing device 110; however, visual pattern learning component 204 can be housed on server computer 120, a separate computing device not depicted in FIG. 1 and/or visual pattern learning component 204 can be a stand-alone device. Generally, visual pattern learning component 204 may be housed anywhere in environment 100, as long as it is remains a subcomponent of adaptive illumination component 112.

In various embodiments, visual pattern learning component 204 can learn a driver's visual pattern based on the driver's eye movement. In various embodiments, utilizing camera component 108, visual pattern learning component 204 can collect, analyze, and/or store a driver's eye-tracking data, in which the eye-tracking data can be used to create the driver's visual pattern. In various embodiments, visual pattern learning component 204 can create a driver profile and learn a driver's visual habits based on the driver's eye-tracking data, average speed, driving characteristics and road conditions. Road conditions can be, but are not limited to, type of road, current weather, traffic conditions, time of day, visibility level, and/or any other data related to road conditions and/or travel conditions known in the art. Driving Characteristics can be, but are not limited to, the vehicles speed, velocity, how fast the driver accelerates, the amount of pressure the driver applies to the breaks, how often the breaks are being applied, the speed at which the gears are shifted, average revolutions per minute (RPM) and/or any other driver and/or vehicle characteristics known in the art. In various embodiments, visual pattern learning component 204 can store the collected eye-tracking data, driving date and/or traveling data on local storage 114 and/or database 124. In an embodiment, visual pattern learning component 204 can create and/or update a driver profile. In various embodiments, visual pattern learning component 204 can retrieve historic data from the driver profile (e.g., eye-tracking data, driver data, driving data, and/or traveling data) to assist in generating an optimized control strategy for the vehicle headlights. In this particular embodiment, as visual pattern learning component 204 observes and learns about the driver's eye movement patterns, over time adaptive illumination component 112 will become faster and better adaptive to the driver's needs. Driver data can be, but is not limited to, the driver's age, visual impairment (i.e., eye-prescription and/or color blindness) if any, driving record, average speed, general routes of travel, make and model of the car, and/or any other personal information known in the art.

$$AP = \Sigma duration(fixation_i)/(\Sigma duration(saccades_i) + \Sigma duration(fixation_i))$$

Equation 3: Illustrates how the attention percentage is calculated.

AP represents "Attention Percentage."

$$G(h=P_{visual}(h,v)-\text{distribution}(h,v)$$

Equation 4: Illustrates how the difference between the real-time visual pattern and the recommended visual pattern is calculated.

Figure 5A:
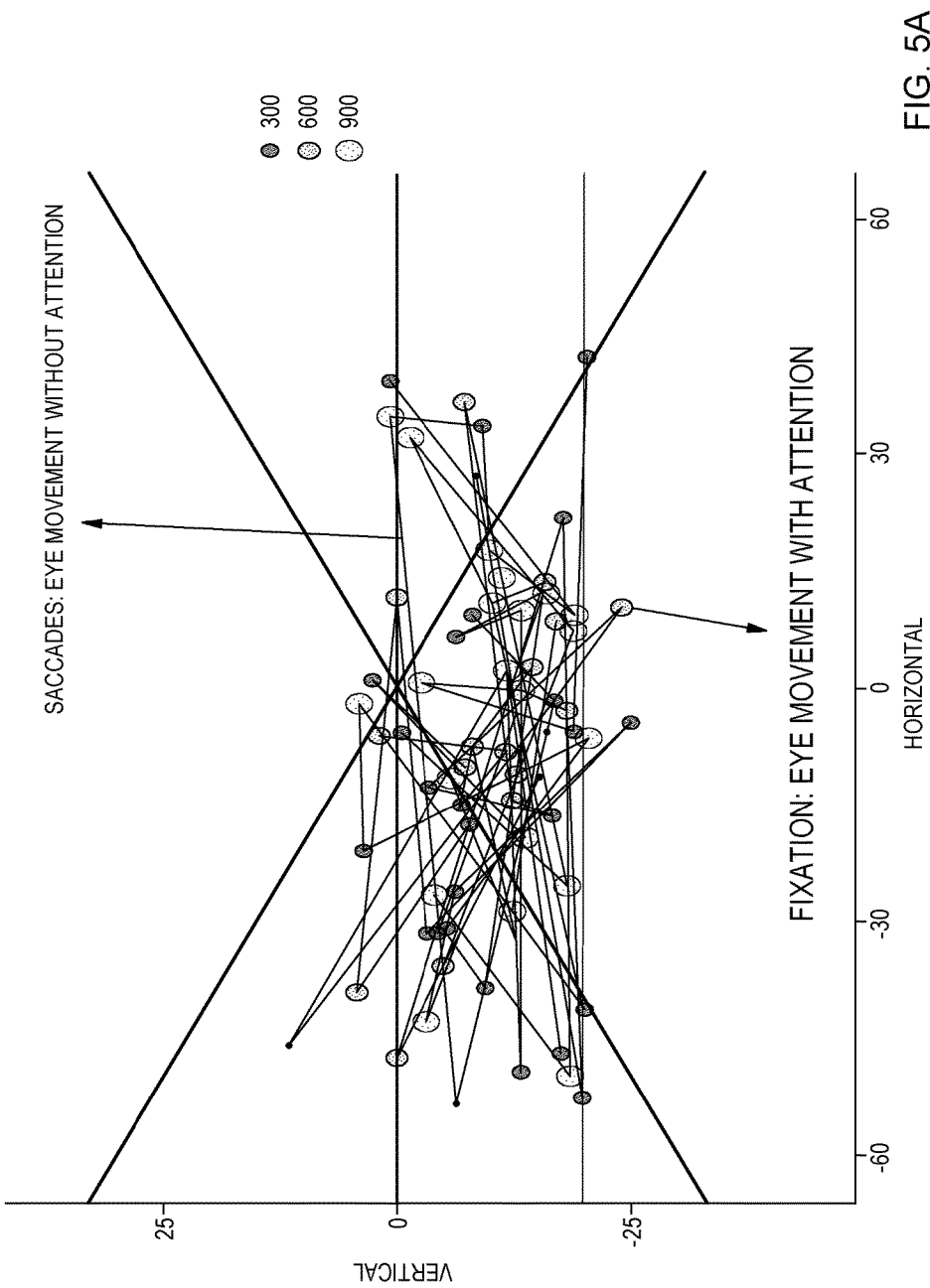
FIG. 5A-5B depict eye-tracking data.
Figure 5B:
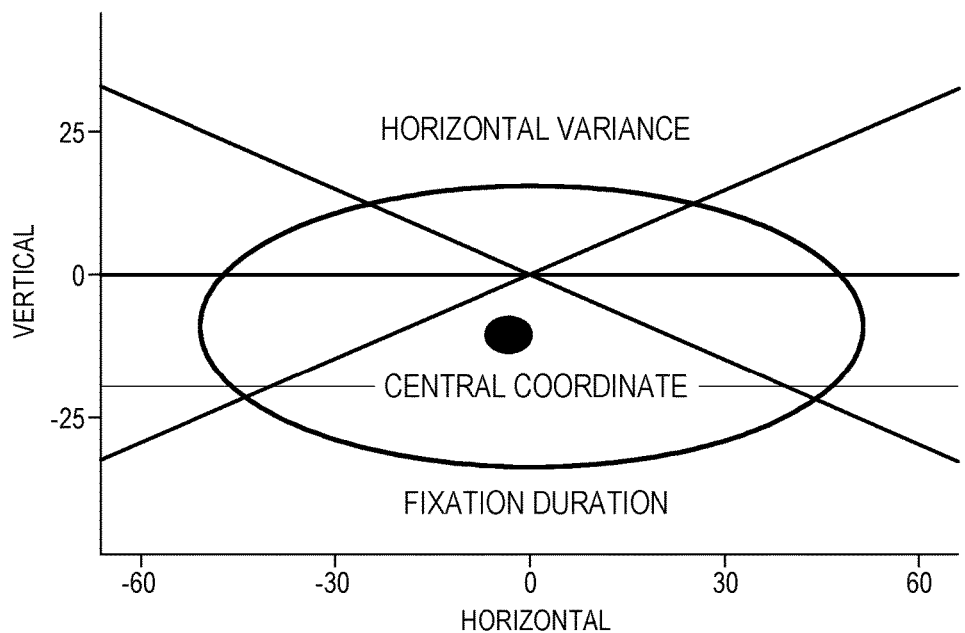

In various embodiments, visual pattern learning component 204 learns a driver's visual pattern by extracting the fixation indexes, which are eye movement with attention, from the saccades indexes, which are eye movement without attention, see FIG. 5A. FIG. 5A. FIG. 5A Illustrates the fixation aggregated in the eye-tracking data. In various embodiments, subsequent to extracting the fixation indexes, visual pattern learning component 204 can label the fixation indexes and/or categorize them into situational profile(s) (e.g., velocity, rotation, road type, road conditions, etc.), driver profile(s), and/or control configurations. Subsequent to labeling, in various embodiments, visual pattern learning component 204 can calculate the visual pattern of fixations into a visual map, see FIG. 5B, and Equation 3. FIG. 5B is a graphical illustration of calculating the visual pattern of fixations in the visual map. In various embodiments, subsequent to calculating the visual patter of fixations into a visual map visual pattern, learning component 204 can calculate the difference between the calculated visual pattern (i.e., real-time driver visual pattern) and the recommended pattern generated by visual priority calculator component 202 see Equation 4. In other embodiments, the calculated visual pattern can be a real-time, delayed, and/or actual driver visual pattern.

In the exemplary embodiment, cognitive enhancing controller component 206 is a subcomponent of adaptive illumination component 112 housed on computing device 110; however, cognitive enhancing controller component 206 can be housed on server computer 120, a separate computing device not depicted in FIG. 1 and/or cognitive enhancing controller component 206 can be a stand-alone device. Generally, cognitive enhancing controller component 206 may be housed anywhere in environment 100, as long as it is remains a subcomponent of adaptive illumination component 112.

In various embodiments, cognitive enhancing controller component 206 enhances and/or alters the vehicle headlight configurations based on the calculated difference between the driver's visual pattern and the recommended visual pattern generated by visual priority calculator component 202 and/or visual pattern learning component 204. In some embodiments, cognitive enhancing controller component 206 can receive and/or retrieve visual pattern(s), eye-tracking data and/or recommended visual pattern data from visual priority calculator component 202 and/or visual pattern learning component 204. In other embodiments, cognitive enhancing controller component 206 can retrieve and/or receive visual pattern(s), eye-tracking data and/or recommended visual pattern data from database 124 and/or local storage 114. In various embodiments, cognitive enhancing controller component 206 receives the information/data recorded by visual priority calculator component 202 and visual pattern learning component 204 in order to enhance the vehicle headlights to improve driver safety. Additionally, in various embodiments, the headlight control configurations are determined by optimizing the settings of one or more learning algorithms to minimize the difference between the driver's visual pattern and the recommended visual pattern. In other embodiments, cognitive enhancing controller component 206 can be the driver's real-time visual pattern.

For example, when a driver is driving down the highway late at night in the countryside where there is very low visibility, visual priority calculator component 202 will record data of the surrounding objects and road conditions and recommend a visual pattern to illuminate further down the road, in which visual pattern learning component 204 is simultaneously tracking and recording the drivers visual pattern. In this particular example, visual pattern learning component 204 takes the drivers current visual pattern, which includes the fixation distribution and index, situational profile, and individual profile and analyzes the current data with the drives historic visual pattern, historic situational profiles, and individual profile. Furthermore, in this particular example, visual pattern learning component 204 determines the average gap/difference between the real visual pattern and the recommended visual pattern and determines that the driver is straining their eyes trying to focus on the road ahead. In this particular example, subsequent to the analysis, cognitive enhancing controller component 206 takes the analysis and generates vehicle headlight configuration enhancements and adjusts the current vehicle headlight configurations to reflect the newly generated headlight configurations, which are to enhance the brightness of the headlights and to aim the headlights further down.

In another example, when a driver is stuck in bumper to bumper traffic late at night, visual priority calculator component 202 would recommend a visual pattern that focuses on short distances. In this particular example, visual pattern learning component 204 determines the driver is predominately focusing on the bumper of the car and learns and calculates the driver's visual pattern based on the driver's real-time eye-tracking data. In this example, cognitive enhancing controller component 206 would then take the data from the analysis and configure the vehicle headlights to dim focus on the center of the vehicles bumper in order to make the leading vehicles break lights more visible when they break. Additionally, cognitive enhancing controller component 206 would configure the vehicle headlights to sharply brighten when the driver gets too close to a surrounding vehicle.

Figure 3:
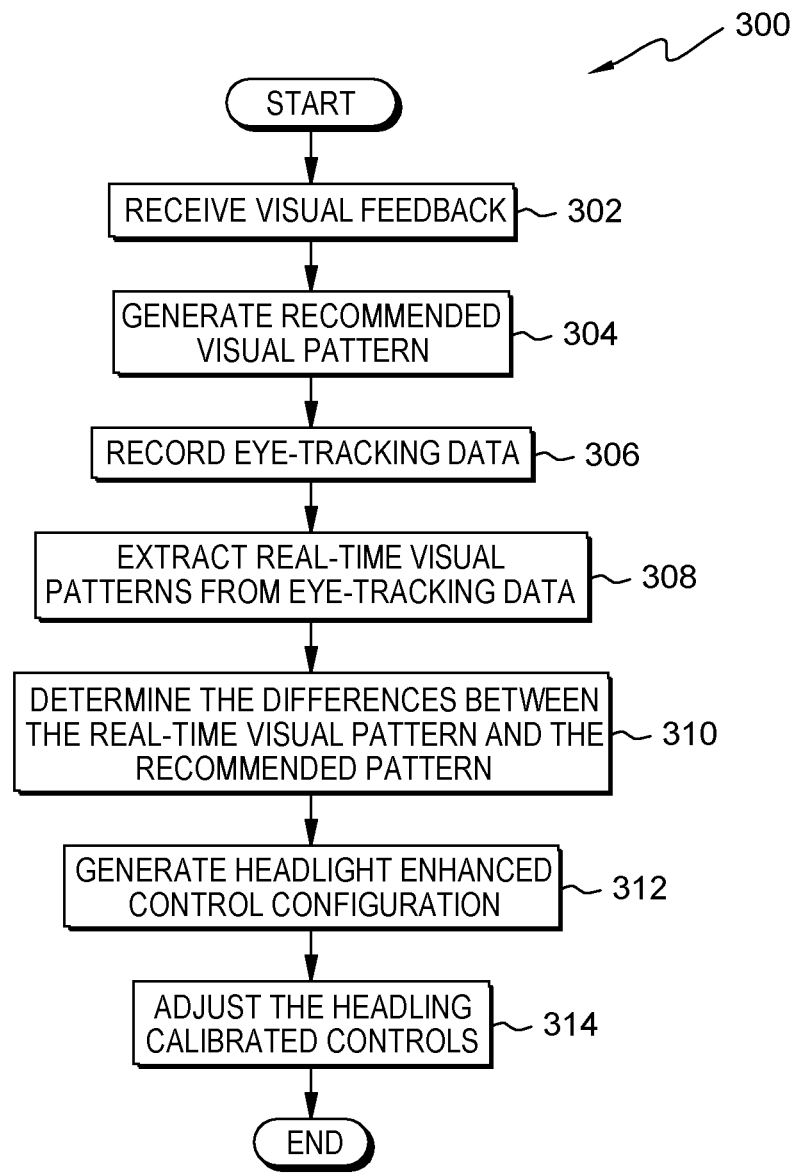
FIG. 3 illustrates operational steps of adaptive illumination component, on a client device within the distributed data processing environment of FIG. 1, in accordance with an embodiment of the present invention.

FIG. 3 is a flowchart depicting operational steps for a method for adapting vehicle illumination utilizing visual pattern learning and cognitive enhancing computing environment for adaptive illumination component 112 for adaptive illumination component 112, on computing device within distributed data processing environment 100 of FIG. 1, in accordance with an embodiment of the present invention. It should be appreciated that FIG. 3 provides only an illustration of one implementation and does not imply any limitations with regard to the environments in which different embodiments can be implemented. Many modifications to the depicted environment can be made.

In step 302, visual priority calculator component 202 receives visual feedback. In various embodiments, visual priority calculator component 202 receives visual feedback/ data through radar and/or sensor technology that can identify surrounding objects, the vehicles velocity, and road conditions. In various embodiments, visual priority calculator component 202 can take the received visual feedback and/or data and can calculate time to collision (TTC) and risk priority (P), see Equation 1. For example, visual priority calculator component 202 would calculate a short TTC and high P when a driver is in slow-paced high volume traffic at night.

In step 304, visual priority calculator component 202 generates a recommended visual pattern. In various embodiments, visual priority calculator component 202 can transform the visual feedback data received in step 302 to generate a recommended visual pattern based on the proximity of objects surrounding the vehicle and/or current road conditions, see Equation 1. In some embodiments, visual priority calculator component 202 can store the recommended visual pattern on local storage 114 and/or database 124. In various embodiments, visual priority calculator component 202 can compare the received visual feedback data and the historic/previously stored visual feedback data to generate an optimized recommended visual pattern. In other embodiments, visual priority calculator component 202 can send the recommended visual pattern to visual pattern learning component 204 and/or store the recommended visual pattern until visual pattern learning component 204 requests it. Continuing the previous traffic example from step 302, visual priority calculator component 202 would generate a recommended visual pattern that focuses on objects in front and on the side of the vehicle.

In step 306, visual pattern learning component 204 records eye-tracking data. In various embodiments, visual pattern learning component 204 tracks a driver's real-time visual pattern through eye-tracking, via camera component 108. In various embodiments, visual pattern learning component 204 can continuously track and/or record a driver's real-time visual pattern and create eye-tracking data. In some embodiments, visual pattern learning component 204 can store current visual patterns (i.e., eye-tracking data) on local storage 114 and/or database 124. In various embodiments, visual pattern learning component 204 can monitor and/or record current road conditions, in which visual pattern learning component 204 can store on local storage 114 and/or database 124. In various embodiments, visual pattern learning component 204 can create a driver profile utilizing the current and historic eye-tracking data and/or road conditions. Continuing the previous traffic example from step 304, visual pattern learning component 204, through camera component 108, tracks the driver's eyes movements and patterns, as the driver focuses on the cars ahead and the surrounding environment. In this particular example, the driver's eye movements and primary areas of attention and focus happen to be on the leading vehicles break lights and the vehicles side mirrors. In various embodiments visual pattern learning component 204 records, measures, collects, and learns a driver's eye-tracking data. Additionally, in various embodiments, visual pattern learning component 204 creates a driver's real-time visual pattern to be used later for analysis.

In step 308 visual pattern learning component 204 extracts real-time visual patterns from eye-tracking data. In various embodiments, visual pattern learning component 204 can extract one or more real-time and/or historic visual patterns from the eye-tracking data. More specifically, in various embodiments, visual pattern learning component 204 can extract fixation indexes from the eye-tracking data and label and profile the fixation indexes based on their association to the driver, the vehicle, and/or the road conditions. In various embodiments, visual pattern learning component 204 can categorize the fixation indexes into three different profiles: (1) a situational profile, which includes, but is not limited to velocity, rotation, time of day, and road conditions, (2) a driver profile, and (3) a control configurations. For example, visual pattern learning component 204 will take the vehicles speed and the terrain and dissect and label the velocity from the vehicle's speed and place it in the situational profile, while simultaneously associating the driver's eye-tracking data with the driver profile. Continuing the previous traffic example from step 306, visual pattern learning component 204 extracts the driver's focal points of interest, which happens to be the leading vehicles break lights and the vehicles side mirrors, while taking into account the vehicles current headlight configurations and/or settings, which, in this particular example, are simple set to the factory configured "automatic" light setting. In various embodiments, visual pattern learning component 204 collects, analyzes, and/or stores the eye-tracking data, the road conditions, the driver's fixation indexes, and the current headlight configurations.

In step 310, visual pattern learning component 204 determines the differences between the real-time visual pattern and the recommended visual pattern. In various embodiments, visual pattern learning component 204 analyzes the real-time visual pattern and the recommended visual pattern by determining the differences between the one or more real-time visual patterns and the one or more recommended visual patterns generated by visual priority calculator component 202 by calculating the difference between the one or more real-time visual patterns and the one or more recommended visual patterns, see Equation 4. In various embodiments, visual pattern learning component 204 can perform an analysis and calculate the differences between the recommended visual pattern and the real-time visual pattern a preset number of calculations and/or perform as many calculations possible in a set amount of time. In other embodiments, visual pattern learning component 204 can calculate the differences between the recommended visual pattern and the real-time visual pattern as many times as necessary to fit within a confidence interval. Continuing the traffic example from step 308, visual pattern learning component 204 calculates the difference between the driver's real-time visual pattern, the current headlight configurations and/or settings and the recommended visual pattern for 60 seconds and then takes the average of the total amount of calculations.

In step 312, cognitive enhancing controller component 206 generates enhanced headlight control configuration. In various embodiments, cognitive enhancing controller component 206 can receive the analysis and/or determined difference between the real-time visual pattern and the recommended pattern from visual pattern learning component 204 and generate one or more headlight control configurations to reflect the analysis and/or determined difference and increase driver safety. Continuing the previous traffic example from step 310, subsequent to determining the differences between the real-time visual pattern and the recommended visual pattern, cognitive enhancing controller component 206 analyzes the data/calculations and generates new control settings/configurations to dim and aim the vehicle's headlights in-between the leading vehicle headlights rendering the brake lights more visible and configuring them to sharply brighten when the driver gets within a high risk distance of the leading car. In various embodiments cognitive enhancing controller component 206 can receive data from visual pattern learning component 204 and/or visual priority calculator component 202.

In step 314, cognitive enhancing controller component 206 adjusts the headlight calibration controls. In various embodiments, cognitive enhancing controller component 206 adjusts the headlights calibration controls based on the generated enhanced headlight control configuration. In various embodiments, cognitive enhancing controller component 206 can adjust and/or update a vehicles headlight configuration control in order to comply with the generated enhanced headlight control configuration, for example, enhancing the brightness, angle, and focus of the vehicle headlight. In various embodiments, cognitive enhancing controller component 206 can store the enhanced headlight control configurations on local storage 114 and/or database 124 and replace and/or update the previous/historic headlight control configurations in the driver profile. In some embodiments, cognitive enhancing controller component 206 can retrieve and/or analyze historic headlight control configurations from the driver profile to better enhance the headlight control configurations.

In various embodiments, cognitive enhancing controller component 206 can retrieve previously stored/historic visual patterns, recommended visual patterns, current road conditions, and/or historic road conditions from a driver's profile to enhance the vehicle headlight configurations. Continuing the traffic example from step 312, cognitive enhancing controller component 206 adjusts the factory configured settings to conform to the new control settings/configurations and stores the new settings/configurations on local storage 114. In various embodiments, cognitive enhancing controller component 206 can learn how to automatically adjust the headlights by comparing previously stored visual patterns and/or road conditions and retrieving the previously generated headlight control configurations associated with the previously stored visual patterns and/or road conditions. In other embodiments, cognitive enhancing controller component 206 can learn a driver's driving habits and retrieve previously stored enhanced headlight control configuration based on the driver's current visual pattern and/or road conditions.

Figure 4:
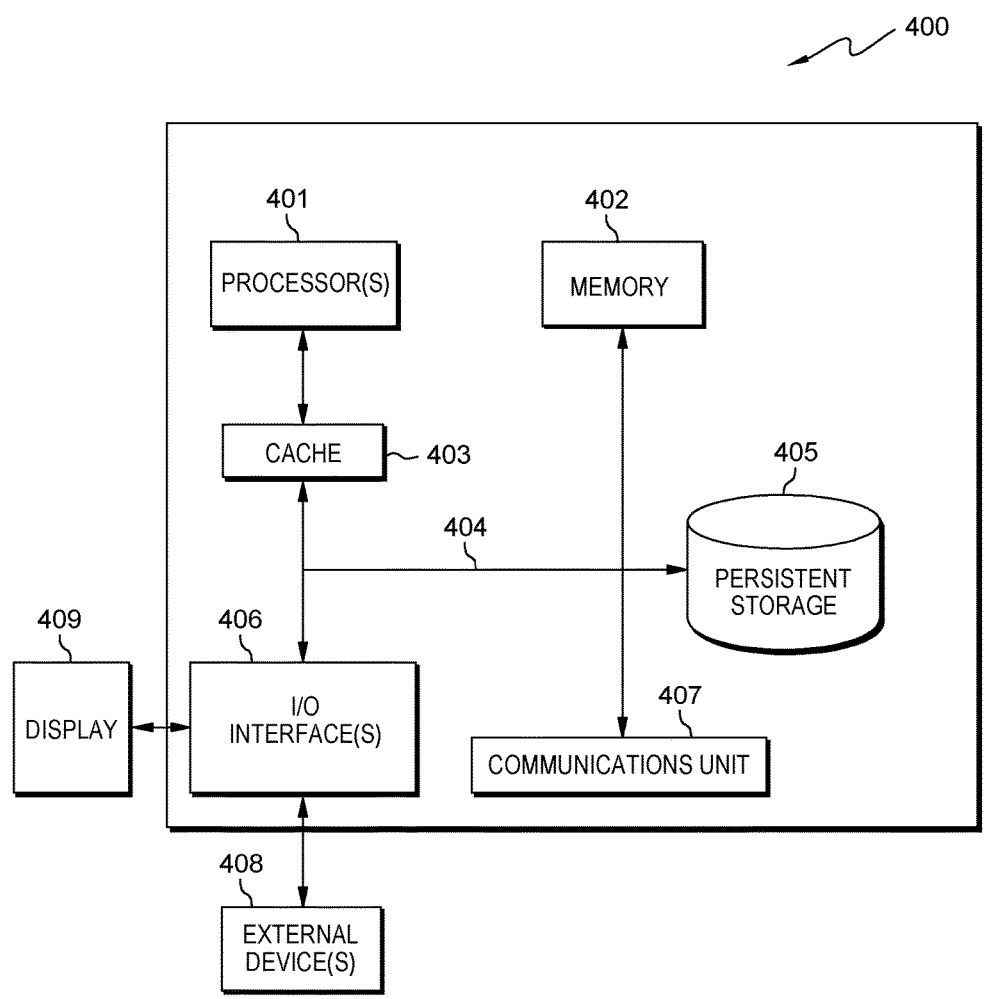
FIG. 4 depicts a block diagram of components of the server computer executing the calibration component within the distributed data processing environment of FIG. 1, in accordance with an embodiment of the present invention.

FIG. 4 depicts a block diagram of components of server computer 104 within distributed data processing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

FIG. 4 depicts a block diagram of components of a computing device within distributed data processing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

FIG. 4 depicts computer system 400, where server computer 120 represents an example of computer system 400 that includes adaptive illumination component 112. The computer system includes processors 401, cache 403, memory 402, persistent storage 405, communications unit 407, input/output (I/O) interface(s) 406 and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processors 401 by holding recently accessed data, and data near recently accessed data, from memory 402.

Program instructions and data used to practice embodiments of the present invention may be stored in persistent storage 405 and in memory 402 for execution by one or more of the respective processors 401 via cache 403. In an embodiment, persistent storage 405 includes a magnetic hard disk drive. Alternatively, or in addition to a magnetic hard disk drive, persistent storage 405 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data used to practice embodiments of the present invention may be downloaded to persistent storage 405 through communications unit 407.

I/O interface(s) 406 enables for input and output of data with other devices that may be connected to each computer system. For example, I/O interface 406 may provide a connection to external devices 408 such as a keyboard, keypad, a touch screen, and/or some other suitable input device. External devices 408 can also include portable computer readable storage media such as, for example, thumb drives, portable optical or magnetic disks, and memory cards. Software and data used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a driver and may be, for example, a computer monitor.

What is claimed is:

1. A method for adjusting headlight calibration controls based on eye-tracking data for improving driver safety, the method comprising:

receiving, by one or more processors, visual feedback, wherein the visual feedback is based on radar data;

generating, by the one or more processors, a recommended visual pattern based on the visual feedback;

tracking, by the one or more processors, a driver's real-time visual pattern, wherein tracking a driver's real-time visual pattern further comprises driving characteristics, wherein driving characteristics comprise the vehicles speed, velocity, how fast the driver accelerates, the amount of pressure the driver applies to the breaks, how often the breaks are being applied, the speed at which the gears are shifted, and average revolutions per minute (RPM);

extracting, by the one or more processors, the driver's real-time visual patterns from eye-tracking data, wherein extracting the driver's real-time visual patterns from the eye-tracking data further comprises extracting fixation indexes from the eye-tracking data, wherein eye-tracking data comprises: where the driver is looking, where the driver is focusing, the area of the road the driver is not focusing on, the driver's peripheral vision, visual blind spots, when the driver blinks, the rate at which the driver blinks, how strained the drivers eyes become while trying to focus on the road, road visibility, level of visual stimuli on the road, or how the drivers pupil react to different stimuli;

determining, by the one or more processors, differences between the recommended visual pattern and the driver's real-time visual pattern;

generating, by the one or more processors, enhanced headlamp control configurations based on the determined differences between the recommended visual pattern and the driver's real-time visual pattern;

adjusting, by the one or more processors, headlamp calibration controls based on the enhanced headlamp control configuration;

creating, by the one or more processors, a driver profile;

storing, by the one or more processors, driver data to a database; and updating, by the one or more processors, driver profile data.

* * * * *